United States Patent
Marshall-Wilson

(10) Patent No.: US 8,396,002 B2
(45) Date of Patent: Mar. 12, 2013

(54) APPARATUS AND METHODS FOR COMMUNICATING WITH A CALL GROUP

(75) Inventor: Maria I. Marshall-Wilson, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 679 days.

(21) Appl. No.: 11/364,144

(22) Filed: Feb. 27, 2006

(65) Prior Publication Data
US 2007/0201376 A1    Aug. 30, 2007

(51) Int. Cl.
*H04J 1/16*     (2006.01)
*H04L 1/00*     (2006.01)
*H04L 12/16*    (2006.01)
*H04B 7/00*     (2006.01)
*H04W 24/00*    (2009.01)

(52) U.S. Cl. ........ 370/252; 370/259; 455/518; 455/519; 455/456.1

(58) Field of Classification Search .................. 370/241, 370/252, 259, 260; 455/39, 73, 90.2, 403, 455/404.1, 422.1, 456.1, 500, 507, 517, 518, 455/519, 520, 521; 715/700, 705, 714; 709/227, 709/228

See application file for complete search history.

(56) References Cited

U.S. PATENT DOCUMENTS

| | | | |
|---|---|---|---|
| 6,477,387 B1* | 11/2002 | Jackson et al. | 455/519 |
| 6,701,156 B2* | 3/2004 | Akhteruzzaman et al. | 455/521 |
| 2003/0100326 A1* | 5/2003 | Grube et al. | 455/515 |
| 2004/0133683 A1* | 7/2004 | Keller et al. | 709/227 |
| 2004/0198376 A1* | 10/2004 | Chandhok et al. | 455/456.1 |
| 2004/0198386 A1* | 10/2004 | Dupray | 455/456.1 |
| 2005/0034075 A1* | 2/2005 | Riegelman et al. | 715/714 |
| 2005/0170808 A1* | 8/2005 | Hamilton | 455/404.1 |
| 2005/0221851 A1* | 10/2005 | Grivas et al. | 455/518 |
| 2006/0120516 A1* | 6/2006 | Armbruster et al. | 379/37 |
| 2006/0121924 A1* | 6/2006 | Rengaraju et al. | 455/518 |
| 2006/0240771 A1* | 10/2006 | Graves et al. | 455/39 |
| 2006/0276168 A1* | 12/2006 | Fuller et al. | 455/404.2 |
| 2007/0197248 A1* | 8/2007 | Reich et al. | 455/518 |

FOREIGN PATENT DOCUMENTS

WO    WO 2005029899 A1 *    3/2005

* cited by examiner

*Primary Examiner* — Ricky Ngo
*Assistant Examiner* — Paul H Masur
(74) *Attorney, Agent, or Firm* — Raphael Freiwirth

(57) ABSTRACT

The disclosed embodiments provide apparatus and methods for establishing a group communications session with selected ones of a plurality of communications devices that define a call group. The apparatus includes a dispatch module operable to receive event information and communication device information associated with each of the plurality of communications devices. The dispatch module is further operable to define the members of the call group based on a predetermined relationship between their respective device information and the event information. Additional embodiments include apparatus and methods for dispatching event information to such an ad hoc call group.

50 Claims, 7 Drawing Sheets

US 8,396,002 B2

APPARATUS AND METHODS FOR COMMUNICATING WITH A CALL GROUP

FIELD OF INVENTION

The disclosed embodiments relate to group, or point-to-multipoint, communication systems, and more particularly, to apparatus and methods relating to a group communications system.

BACKGROUND

Group or point-to-multipoint communication systems have been used to provide communications generally between a central location and one or more users of the system. For example, dispatch systems using Land Mobile Radios (LMRs) have been used in trucks, taxis, buses, and other vehicles in order to communicate scheduling information between a central dispatch center and one or more corresponding fleet vehicles. Communications may be directed at a specific vehicle in the fleet or to all vehicles simultaneously.

Another example of a point to multipoint communications system is a wireless push-to-talk system. Such a system allows a group of individuals, each having a wireless communication device, to communicate with other members of the group. Typically, a push-to-talk system relies on a single frequency, or dedicated channel, over which communications are received by the wireless communication devices. In most systems, only one member may transmit information to the other members at any given time. However, all members can listen to the dedicated broadcast channel to receive communications from the single member who is transmitting. Members desiring to transmit to other members of the system typically send an access request by depressing a push-to-talk ("PTT") button on their respective communication device that allows the user sole access to the dedicated channel. Pushing the button indicates the user's request for the "floor." If granted the floor, or talker permission, the user then generally speaks for a few seconds, after which the user releases the PTT button, and other speakers can request the floor. Communication is generally from one speaker to a group of listeners, but may be one-to-one. As mentioned above, this service has traditionally been used in applications where one person, a "dispatcher," needs to communicate to a group of people, such as field service personnel or taxi drivers. The group of people requiring communications with each other is commonly known as a "net," and each member of the net may be referred to as a "net member."

Similar services have been offered on the Internet and are generally known as "voice chat." These services are usually implemented as personal computer applications that send vocoder frames in Internet protocol (IP) packets, i.e., voice-over-IP (VoIP) service, to a central group chat server, or possibly from client-to-client in a peer-to-peer service.

In some instances, these group communications systems can be wasteful because they are over-inclusive. For example, in the case of public safety and/or emergency response, a dispatcher typically utilizes a broadcast communication to notify a particular service group, or group of net members, when an event occurs. For example, all police receive a broadcast communication that a particular crime is in progress at a particular location. Generally, only one or a select number of net members will actually end up responding to the broadcast, based on any number of factors such as their availability, their proximity to the crime location, their capability of dealing with the particular crime, etc. As such, the net is generally over-inclusive. With such an over-inclusive net, resources are wasted. Such resources include the dedicated broadcast channel on all but those select net members who are able to respond to the communication, the time spent by each net member associated with listening and responding to the broadcast, etc. Thus, a group communications system is desired which provides for a more efficient use of the resources associated with the group communications system.

BRIEF SUMMARY

The disclosed embodiments provide an apparatus and method for establishing a group communications session with a plurality of communications devices based a predetermined relationship between event information received by a dispatch component of the apparatus and respective device information associated with each of the plurality of communications devices. Further, the disclosed embodiments provide an apparatus and method for dispatching event information to such a call group in a group communications session.

In one embodiment, a method of setting up a group communication session over a communications network comprises receiving event information and a plurality of device information each respectively corresponding to one of a plurality of communication devices operable in the communications network. The method further includes establishing a call group comprising at least one member selected from the plurality of communications devices based on a predetermined relationship between the event information and each of the plurality of device information. In an alternate embodiment, a computer-readable medium stores a sequence of instructions, which when executed by a processor of a communication apparatus, causes said communication apparatus to perform the above-defined actions. In another alternate embodiment, at least one processor is configured to perform the above-defined actions.

In still another embodiment, an apparatus for establishing group communications comprises a means for receiving notification of an event, the event comprising event description information and event location information; a means for receiving communication device location information for each of a plurality of communications devices operable on a communications network; a means for determining a group comprising at least one member selected from the plurality of communications devices depending on a predetermined relationship between the event location information and the respective communication device location information associated with each of the plurality of communications devices; and a means for forwarding the event description information over the communication network to at least one of the group in a group communications session.

In a further embodiment, a communications apparatus comprises a bus and a processor, memory and communications interface coupled to the bus. The communications interface operable to receive event information associated with an event and a plurality of communication device information each respectively corresponding to one of a plurality of communication devices operable on a communications network. The apparatus also comprises a dispatch module storable in the memory and operable by the processor to obtain the event information and the plurality of communication device information. The dispatch module is further operable to select at least one of the plurality of communication devices to define a call group based on a predetermined relationship between the event information and the respective communication device information. And the dispatch module is operable to forward at least some portion of the event information to at least one member of the call group via a group communications session.

In another embodiment, a communications apparatus comprises a bus and a processor, memory and communications interface coupled to the bus. The communications interface operable to receive event information comprising an event location and an event description and operable to receive a plurality of communication device locations each respectively corresponding to one of a plurality of communication devices operable on a communications network. The apparatus further comprising a dispatch module storable in the memory and operable by the processor to obtain the event information and the plurality of communication device locations. Also, the dispatch module is operable to select at least one of the plurality of communication devices to define a call group based on the respective communication device location. And, the dispatch module is operable to output one of the event description and the event location to at least one member of the call group. Additionally, the apparatus includes a communications module storable in the memory and operable by the processor to establish a group communications session among the selected ones of the plurality of communication devices defining the call group. The communications module is operable to receive the output from the dispatch module and to broadcast at least one of the event description and the event location during the group communications session.

In yet another embodiment, a communications apparatus comprises a means for dispatching information operable to receive event information comprising an event location and an event description, where the means for dispatching information is further operable to receive a plurality of communication device locations each respectively corresponding to one of a plurality of communication devices operable on a communications network. The means for dispatching information is still further operable to select at least one of the plurality of communication devices to define a call group based on the respective communication device location. And the means for dispatching information is operable to output the call group and at least one of the event description and the event location. The apparatus also includes a means for determining location operable to receive a communication device identification and an associated communication device location signal for each of the plurality of communication devices, wherein the means for determining location is operable to generate each communication device location based on the respective communication device location signal, and wherein the means for determining location is further operable to output the respective communication device locations to the means for dispatching information. Further, the apparatus includes a communications means operable to receive the call group and at least one of the event description and the event location and further operable to establish a group communications session among the call group, wherein the communications means is operable to broadcast at least one of the event description and the event location during the group communications session.

In another embodiment, a communications device comprises a first module operable to wirelessly transmit communication device information associated with at least one of the communications device and a communications device user, wherein the communications device user is a potential responder to a predetermined event having event information. The device also includes a second module operable to establish participation in a group communications session of a call group established based on a predetermined relationship between the communication device information and the event information.

In yet another embodiment, a wireless device comprises a means for wirelessly transmitting communication device information associated with at least one of a wireless communications device and a communications device user, wherein the communications device user is a potential responder to a predetermined event having event information, and a means for establishing participation in a group communications session of a call group established based on a predetermined relationship between the communication device information and the event information.

In a further embodiment, a method of participating in a communication based on a device location, comprises wirelessly transmitting communication device information associated with at least one of a communications device and a communications device user, wherein the communications device user is a potential responder to a predetermined event having event information, and establishing participation in a group communications session of a call group established based on a predetermined relationship between the communication device information and the event information. In an alternate embodiment, a computer-readable medium stores a sequence of instructions, which when executed by a processor of a communication apparatus, causes said communication apparatus to perform the above-defined actions. In another alternate embodiment, at least one processor is configured to perform the above-defined actions.

Additional advantages of the disclosed embodiments are set forth in part in the description which follows, and in part are obvious from the description, or may be learned by practice of the disclosed embodiments. The advantages of the disclosed embodiments may also be realized and attained by the means of the instrumentalities and combinations particularly pointed out in the appended claims.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Figure 1:
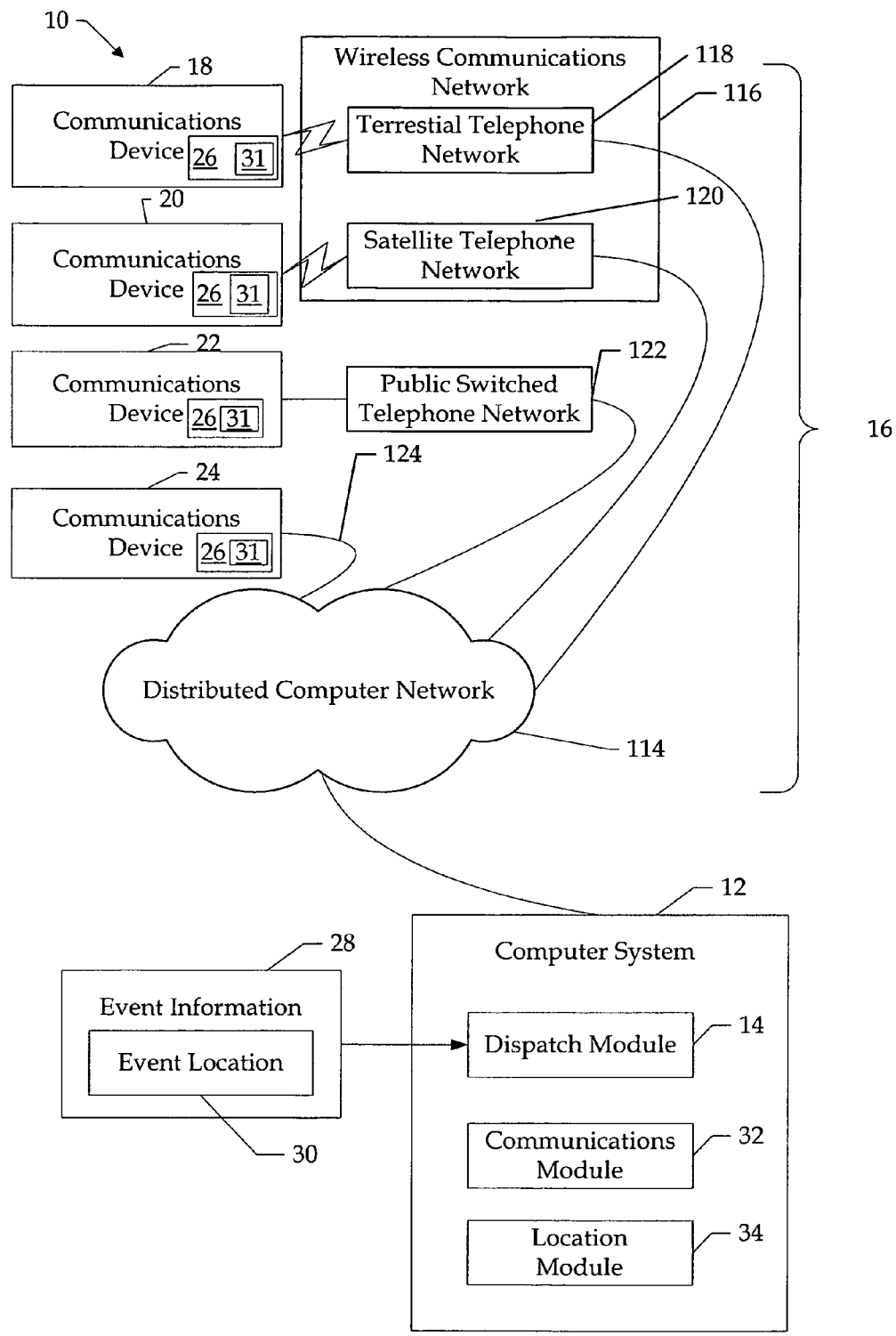
FIG. 1 illustrates one embodiment of a group communications system.
Figure 3:
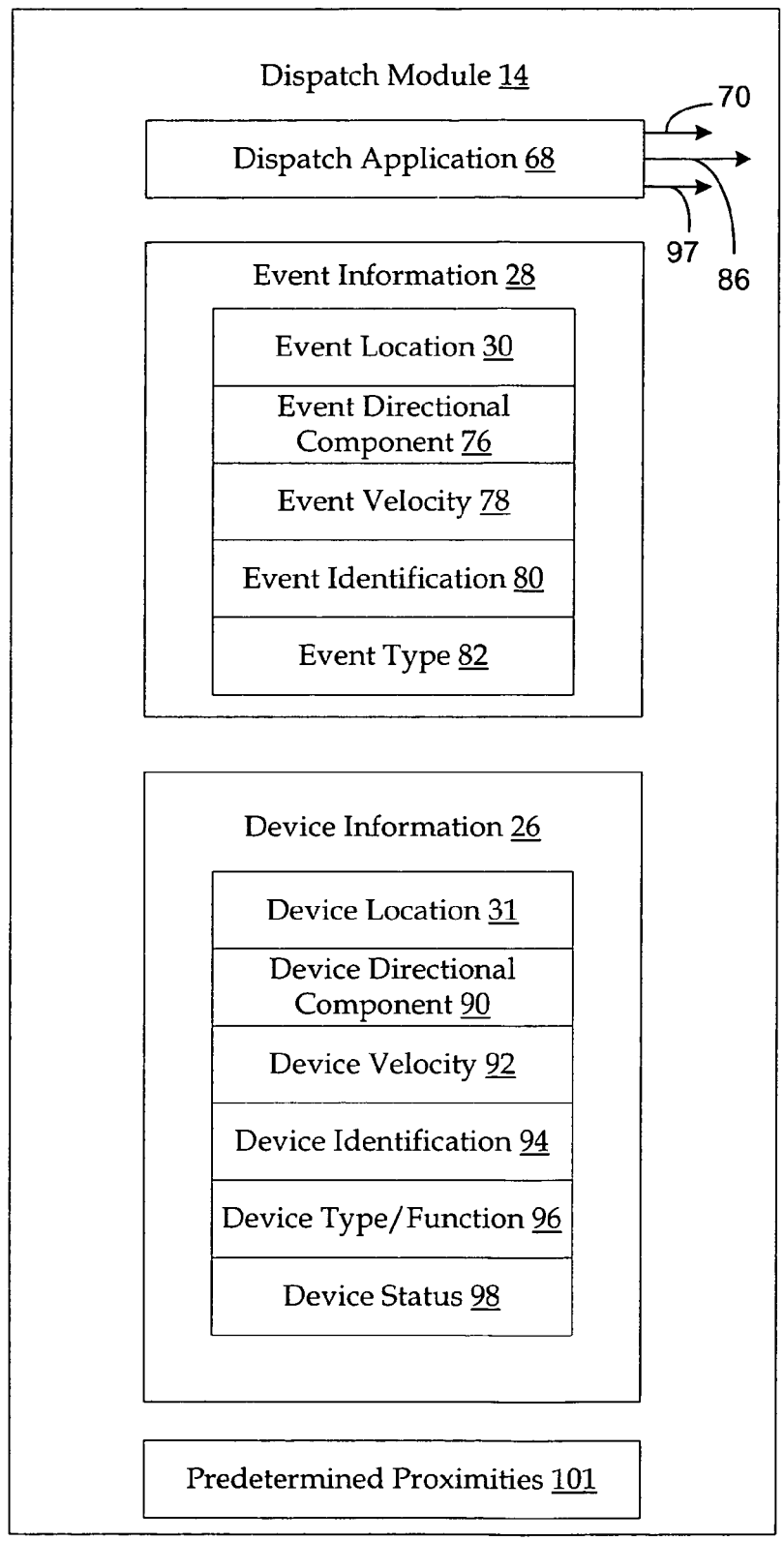
FIG. 3 is a block diagram of one embodiment of a dispatch module associated with the group communications system of FIG. 1.

Referring to FIGS. 1 and 3, in one embodiment, a group communications system 10 includes a computer system 12 having a dispatch module 14 operable to initiate a group communications session across communications network 16 with selected ones of a plurality of communications devices 18, 20, 22, 24 based on a predetermined relationship between their respective device information 26 and event information 28 received by the dispatch module 14. For example, in one embodiment, a dispatcher operating computer system 12 may receive event information 28, including an event location 30, and may operate dispatch module 14 to identify a call group or communications net that includes selected ones of the plurality of communications devices 18, 20, 22, 24, where the selected communications devices have a respective device location 31 within a predetermined proximity to event location 30. In one embodiment, the users of communications devices 18, 20, 22, 24 may include emergency response personnel, such as police, fire and emergency services. Upon establishment of a group communications session with the newly-formed call group, the dispatcher operates dispatch module 14 to relay at least a portion of event information 28 directly to the selected communications devices, which in this embodiment based on their location may be associated with users who have the best and/or fastest ability to respond. Besides proximity, system 10 may identify other predetermined relationships between the device information and the event information to consider in identifying and establishing the call group. For example, the predetermined relationship may include: matching a type of event and a type of service offered by the user of the communications device, e.g. a crime and a police function; matching event information with a device status or priority, e.g. an accident and an available ambulance service; and other similar user-defined matchings of some portion of the event information with some portion of the communications device information. Thus, group communications system 10 optimizes resources by defining a call group comprising a sub-set of the overall plurality of communication devices 18, 20, 22, 24 based upon this predetermined relationship, such as their respective locations, thereby optimizing factors associated with the event, such as the response time of the associated device users, and further freeing-up the communication channels on the non-selected communications devices for more pertinent communications.

Computer system 12, which may form part of a dispatch center, may further include a group communications module 32 to enable one-to-one and/or one-to-many communications with devices 18, 20, 22, 24 across network 16. Computer system 12 may additionally include a location module 34 operable to generate and/or receive the respective communication device locations 31 associated with each of the plurality of communications devices 18, 20, 22, 24. Correspondingly, referring to FIG. 7, each of the plurality of communications devices 18, 20, 22, 24 may include a resident group communications module 36 and a resident location module 38 that respectively operate in conjunction with group communications module 32 and location module 34 of computer system 12. Each resident group communications module 36 is operable to provide each communications device 18, 20, 22, 24 with the ability to exchange voice and/or data communications over communications network 16 with other communications devices, and with computer system 12, in a one-to-one and/or a one-to-many fashion, such as in a group communications session. Also, each resident location module 38 is operable to provide signals associated with the respective communication device location 31, such as a geographic position, for each respective one of the plurality of communications devices 18, 20, 22, 24. Therefore, embodiments of group communications system 10 include dispatch module 14 operating in conjunction with group communications module 32, and/or location module 34, to receive device information 26 and event information 28, and to select from the plurality of users based on their respective communication device information 26 to define an ad hoc call group to address the needs of the event, and to further initiate a group communications session in cooperation with group communications module 32 with the call group in order to broadcast event information 28 to the selected communication devices.

Figure 2:
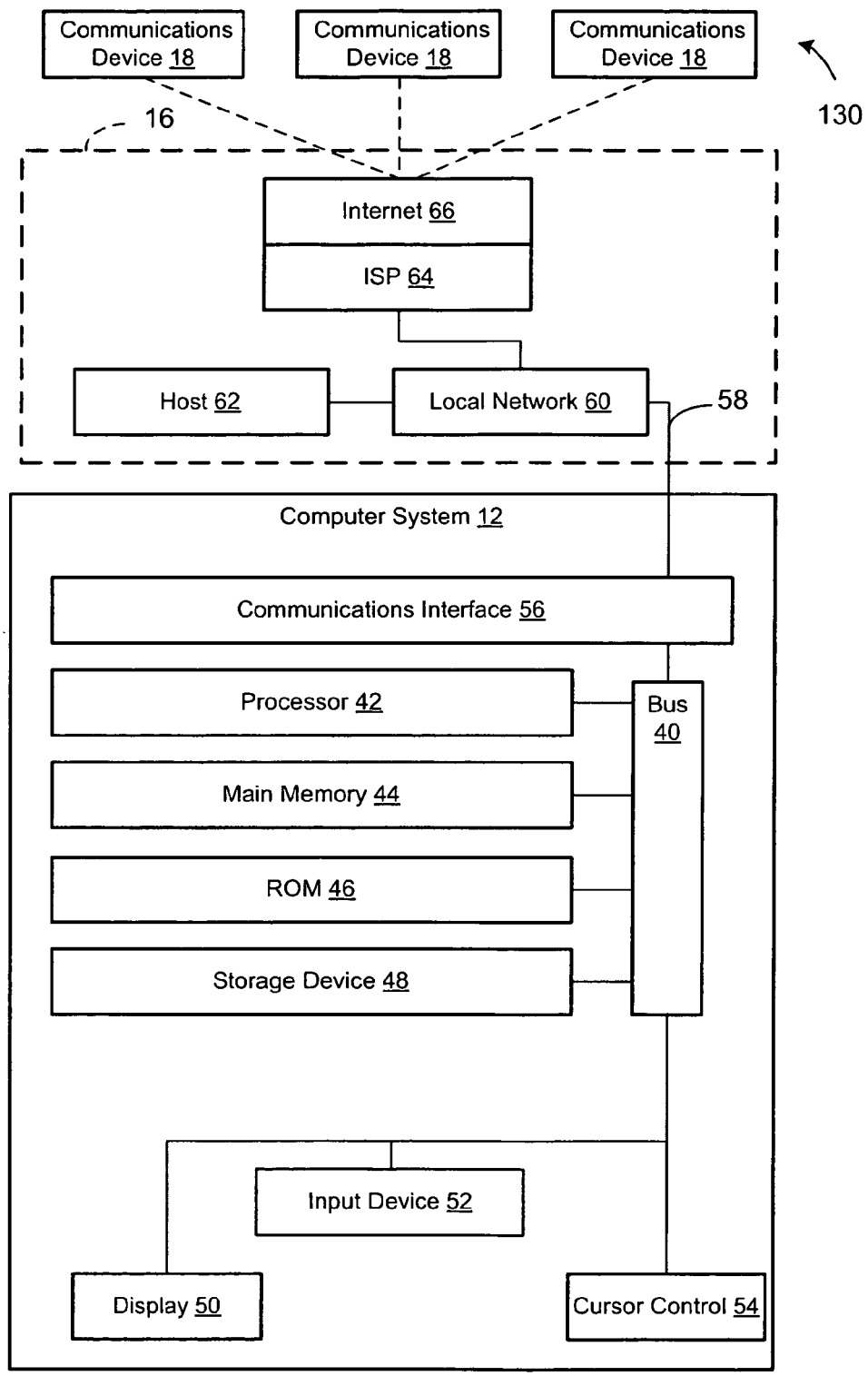
FIG. 2 is a block diagram of one embodiment of a computer system associated with the group communications system of FIG. 1.

Referring to FIG. 2, computer system 12 may be any mechanism, or combination of mechanisms, operable to process and/or store executable instructions associated with group communications system 10. Examples of computer system 12 may include any type of personal computer, a mini-mainframe computer, a server and any combination thereof. Computer system 12 includes a bus 40 or other communication mechanism for communicating information, and a processor 42 coupled with the bus 40 for processing information. Computer system 12 also includes a main memory 44, such as a random access memory (RAM) or other storage device, coupled to the bus 40 for storing data and instructions, such as data and instructions related to dispatch module 14, group communications module 32 and/or location module 34, to be executed by processor 42. Main memory 44 also may be used for storing temporary variables or other intermediate information during execution of instructions to be executed by processor 42. Computer system 12 may further include a read only memory (ROM) 46 or other static storage device coupled to the bus 40 for storing static information and instructions for the processor 42. A storage device 48, such as a magnetic disk or optical disk, is provided and coupled to the bus 40 for additional storage of data and instructions related to group communications system 10.

Computer system 12 may be coupled via the bus 40 to a display 50, such as a cathode ray tube (CRT) or a flat panel display, for displaying information to a user or dispatcher, as will be discussed below in further detail. An input device 52, including alphanumeric and function keys, is coupled to the bus 40 for communicating information and command selections to the processor 42. Another type of user input device may be a cursor control 54, such as a mouse, a trackball, or cursor direction keys for communicating direction information and command selections to processor 42 and for controlling cursor movement on the display 50. This input device typically has two degrees of freedom in two axes, a first axis (e.g., x) and a second axis (e.g., y) allowing the device to specify positions in a plane.

The described embodiments relate to the use of computer system 12, such as the embodiment of FIG. 2, to manage communications with at least one of a plurality of communications devices 18, 20, 22, 24 to carry out the instructions of at least one of dispatch module 14, group communications module 32 and location module 34. According to one embodiment, for example, data relating to device location 31 and event location 30 are tracked and analyzed by computer system 12 in response to processor 42 executing sequences of instructions contained in main memory 44 in response to input received via input device 52, cursor control 54, or communications interface 56. Such instructions may be read into main memory 44 from another computer-readable medium, such as storage device 48. However, the computer-readable medium is not limited to devices such as storage device 48. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 44 causes the processor 42 to perform the process steps described below. In alternative embodiments, hard-wired circuitry and/or firmware may be used in place of or in combination with computer software instructions to implement the described embodiments. Thus, the described embodiments are not limited to any specific combination of hardware circuitry and software.

Communications interface 56, which is coupled to bus 40, provides two-way data communication with another device and/or network. For example, two or more computer systems 12 may be networked together in a conventional manner with each using the communications interface 56. Examples of communications interface 56 may include an integrated services digital network (ISDN) card, a digital subscriber line (DSL) card, or a modem to provide a data communication connection to a corresponding type of telephone line. As another example, communications interface 56 may be a local area network (LAN) card to provide a data communication connection to a compatible LAN. Wireless links may also be implemented. In any such implementation, communications interface 56 is operable to send and receive electrical, electromagnetic and/or optical signals which carry digital data streams representing various types of information. Of particular note, the communications through interface 56 may permit transmission or receipt of data such as event information, communication device information, group communications information such as call group definitions and set-ups, location information and any other data and/or instructions associated with computer device 12 and/or group communications system 10.

Network link 58 typically provides data communication through one or more networks to other data devices. In one embodiment, for example, network link 58 may provide a connection through local network 60 to a host computer 62 or to data equipment operated by an Internet Service Provider (ISP) 64. ISP 64 in turn provides data communication services through the world wide packet data communication network now commonly referred to as the "Internet" 66. Local network 60 and Internet 66 both use electrical, electromagnetic and/or optical signals which carry digital data streams. The signals through the various networks and the signals on network link 58 and through communications interface 56, which carry the digital data to and from computer system 12, are exemplary forms of carrier waves transporting the information. It should be noted that communications network 16 may include any combination of network link 58, local network 60, host computer 62, ISP 64 and Internet 66.

Computer system 12 can send messages, including program code, and receive data through the network(s), network link 58 and communications interface 56. In the Internet example, computer system 12 might transmit a requested code for an application program, such as to one of the plurality of communications devices 18, 20, 22, 24, through Internet 66, ISP 64, local network 60 and communications interface 56. In accordance with the described embodiments, such a downloaded application may be resident group communications module 36 and/or resident location module 38 that provides for the local management on the respective communications device 18, 20, 22, 24 of the data and instructions associated with group communications system 10.

Dispatch module 14, as mentioned above, is operable to receive communication device information 26 associated with the plurality of communications devices 18, 20, 22, 24 and identify the call group from among these devices based on the predetermined relationship between the device information and the event information, such as their respective proximity. Examples of dispatch module 14 may include at least one of a hardware device, a software application, executable instructions, firmware, and any combination thereof embodied within and/or operable by computer system 12.

Figure 4:
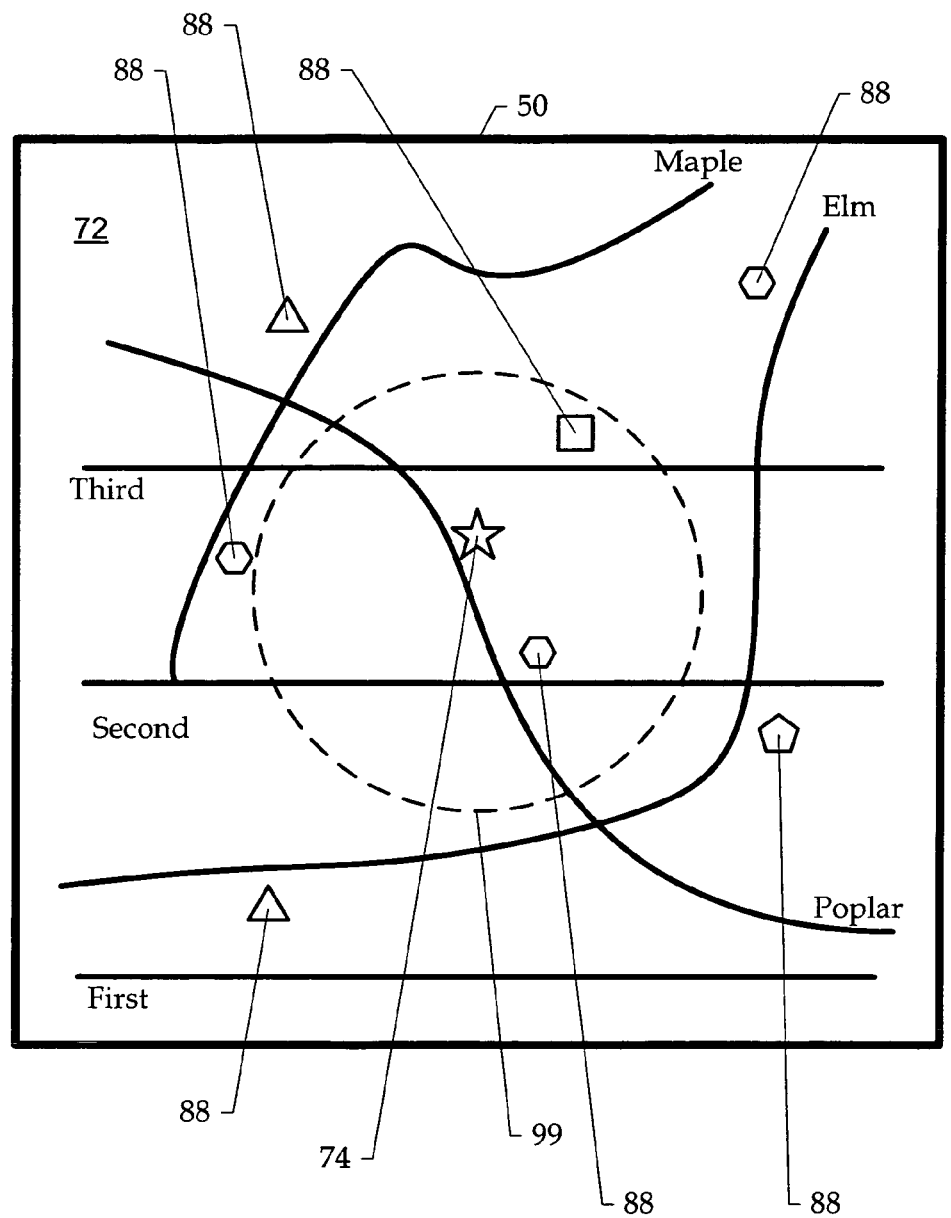
FIG. 4 illustrates one embodiment of a display and user interface associated with the group communications system of FIG. 1.

In one embodiment, for example referring to FIGS. 3 and 4, dispatch module 14 includes a dispatch application 68 including executable instructions operable in combination with received event information 28, including event location 30, that generate event mapping instructions 70. Event mapping instructions 70 are executable by computer system 12 to cause display 50 (FIG. 4) to present a user interface 72 having an event indicator 74 that includes a mapped representation associated with, and/or linked to, at least a portion of the event information. Examples of event indicator 74 include a symbol, a graphic, an alphabetic character, a numerical character, any user recognizable output, and any combination thereof. Further, for example, user interface 72 may be a geographic map of a certain area with event indicator 74 superimposed on or otherwise associated with the map based on event location 30. User interface 72 may include general and/or specific 2- and/or 3-dimensional geographical maps of predetermined areas or locations, such as states, cities, districts, neighborhoods, wilderness areas, national parks, amusement parks, military bases, user-defined areas, and any combination thereof, and may include features such as geographic landmarks, elevations, streets, buildings, service access points (fire hydrants, water mains, sewers, electrical services, telephone services, etc.), user-defined features, and any combination thereof. In an alternate embodiment, event mapping instructions 70 may be executable by computer system 12 to cause display 50 to present a user interface 72 having a textual listing of at least some portion of event information 28.

Event information 28 includes all information received by system 10 relating to an event for which a call group is desired to be established. Examples of such events include situations where public service response is requested, such as a crime, a fire, a medical emergency, a water main break, an electrical line break, a "911" call, etc. Other events include situations related to coordinating a plurality of public and/or private users of communications devices, such as business operations, workgroup communications, social or interest-based group communications, security-related communications such as event and building security, military operations, truck fleet operations, taxi cab operations, rallies, conventions, and any other operation where a central dispatcher is useful. Event location 30 includes a description of the location of the event. Examples of event location 30 include static and/or dynamic information relating to a geographic position, such as a longitude and/or latitude, a street address, a street intersection, a building identification, a reference to a geographical landmark, any combination thereof, and any other information useful in identifying the location of the event. In the case where event location 30 is dynamic, event information 28 may further include an event directional component 76 and/or an event velocity 78. Event directional component 76 includes information relating a direction of movement of event location 30, while event velocity 78 includes information relating to a rate of movement of event location 30. Besides event location 30, event information 28 may include additional details relating to the event, such as an event identification 80 that provides a unique identifier and/or description associated with the event. Event information 28 may also include an event type 82 that provides a classification of the event, such as an association with a predetermined type of communication device user who might respond to or be interested in the event. Event information 28 may also include any other details associated with the event that may be useful to a dispatcher and/or a responder, such as a name and/or contact information of an individual associated with the event, a detailed description of the requested services, equipment and/or medications necessary to respond to the event, etc.

Similarly, in the embodiment of FIGS. 3 and 4, dispatch application 68 also receives a plurality of device information 26, including respective device locations 31, for each of the plurality of communications devices 18, 20, 22, 24 and generates device mapping instructions 86. Device mapping instructions 86 are executable by computer system 12 to cause display 50 (FIG. 4) to present user interface 72 having respective device indicators 88 that include mapped representations associated with, and/or linked to, at least a portion of the respective device information. Examples of device indicators 88 include a symbol, a graphic, an alphabetic character, a numerical character, any user recognizable output, and any combination thereof. In an alternate embodiment, device mapping instructions 86 may be executable by computer system 12 to cause display 50 to present a user interface 72 having a textual listing of at least some portion of the plurality of device information 26. Each of the plurality of device information 26 includes all information received by system 10 relating to a respective one of the plurality of communications devices 18, 20, 22, 24 that may be selected to participate in the group call or group communications session. Device location 31 may be a portion of the received device information 26, and device location 31 includes a description of the location of the respective communications device. Examples of device location 31 include static and/or dynamic information relating to a geographic position, such as a longitude and/or latitude, a street address, a street intersection, a building identification, a reference to a geographical landmark, any combination thereof, and any other information useful in identifying the location of the device. In the case where the respective device location 31 is dynamic, the associated device information 26 may further include a device directional component 90 and/or a device velocity 92. Device directional component 90 includes information relating a direction of movement of the respective device location 31, while device velocity 92 includes information relating to a rate of movement of the respective device location 31. Such dynamic information may be utilized by dispatch application 68 and/or an associated prediction application to project future positions of each respective one of the plurality of communications devices 18, 20, 22, 24 relative to a static and/or dynamic position of event location 30 and therefore identify communications devices within a predicted future proximity of the event. Besides device location 31, the respective device information 26 may include additional details relating to the communications device, such as a device identification 94 that provides a unique identifier and/or description associated with the device and/or the user of the respective device. Examples of device identification 94 include a mobile identification number, a phone number, an Internet Protocol ("IP") address, a SIM card, a security ID module, any other type of tracking device, a user name or identification, and any combination thereof. Device information 26 may also include a device type 96 that provides a classification of the device and/or device user, such as a predetermined type and/or function and/or role associated with the communication device user, e.g., police, fire, ambulance, medical personnel, etc. Additionally, device information 26 for each respective device may include a device status 98 that represents a current ability of the device and/or device user to participate in a group call and/or respond to an event. For example, device status 98 may include an "available" status indicating that the respective device user is not engaged and is available to respond to an event and/or participate in a group call. Conversely, device status 98 may include a "not available" status indicating that the respective device user is not accessible and/or is already participating in another group call. Alternatively, or in combination, device status 98 may include a priority associated with each device and/or device user. Such a priority may be defined by a user, and/or automatically assigned by the system, based on factors such as location, user capability, user experience, job description, rank, grade, and any other parameter useful in determining a preferred order of responsive devices/users. Device information 26 may also include any other details associated with the device and/or device user that may be useful to a dispatcher and/or another communication device user, such as details about a device user's capabilities or available equipment, etc. Further, any one or any combination of the respective device information 26 may be utilized by dispatch module 14 to identify selected ones of the plurality of communications devices 18, 20, 22, 24 for participating in the ad hoc call group or communications session. For instance, dispatch module 14 may only select communications devices having a predetermined device type 96, such as only police, and/or a predetermined device status 98, such as an "available" status.

Additionally, in the embodiment of FIGS. 3 and 4, dispatch application 68 is operate to generate relationship mapping instructions 97. Relationship mapping instructions 97 are executable by computer system 12 to cause display 50 (FIG. 4) to present user interface 72 having a relationship indicator 99 that identifies communications devices having the predetermined relationship with event information 28. For example, in one embodiment, relationship indicator 99 may include a mapped representation associated with a predetermined or user-defined area or region, or the border of such an area or region, superimposed or otherwise associated with the plurality of device indicators 88, corresponding with each of the plurality of communications devices 18, 20, 22, 24. For example, dispatch module 14 may include a plurality of predefined proximities 101, such as a list of varying sized areas, regions, a set of one or more predetermined radii from the event location, ranges and/or encompassing borders, from which the user/dispatcher may select in order to define relationship indicator 99. Such an area or region may be centered about event location 30, or may have a center that is offset in at least one dimension from event location 30. For example, such a centered area or region may be defined by a predetermined radius from event location 30. In another example, an area or region having a center offset from event location 30 may be useful with the event location is moving, and/or when certain boundaries adjacent to event location 30 make such an offset area or region useful. In alternative embodiments, such an area or region may be shaped like a square, a rectangle, an oval, an ellipse, any combination thereof, and any combination or straight and/or curved lines. Further, such an area or region may correspond to, or be bound by, other geographic features, such as a geographic marker, a water boundary, a land boundary, a politically-defined area such as a state or district, a predetermined area of responsibility, etc. Other examples of relationship indicator 99 include a symbol, a graphic, an alphabetic character, a numerical character, any user recognizable output, and any combination thereof. For example, relationship indicator 99 may represent all similar device types 96 and/or device statuses 98 in the same manner, such as with a common color, symbol, etc. In another embodiment, instead of mapping an area or region, or a border to an area or region, relationship indicator 99 may change a characteristic of device indicator 88 to indicate that it is within the defined area or region. For example, device indicator 88 may be represented by a different color, in a different format, etc. depending on whether or not it is within the defined area or region. In an alternate embodiment, relationship mapping instructions 97 may be executable by computer system 12 to cause display 50 to present a user interface 72 having a textual listing of relationship indicator 99, such as a written description defining an area or region, a matching type/function, and a matching status/priority.

Location module 34, as mentioned above, is operable to provide dispatch module 14 with the respective device locations 31 for the plurality of communications devices 18, 20, 22, 24. Examples of location module 34 may include at least one of a hardware device, a software application, executable instructions, firmware, and any combination thereof embodied within and/or operable by computer system 12, such as the QPoint™ Positioning Software and gpsOne® hybrid Assisted GPS wireless location technology available from Qualcomm, Inc. of San Diego, Calif.

Figure 5:
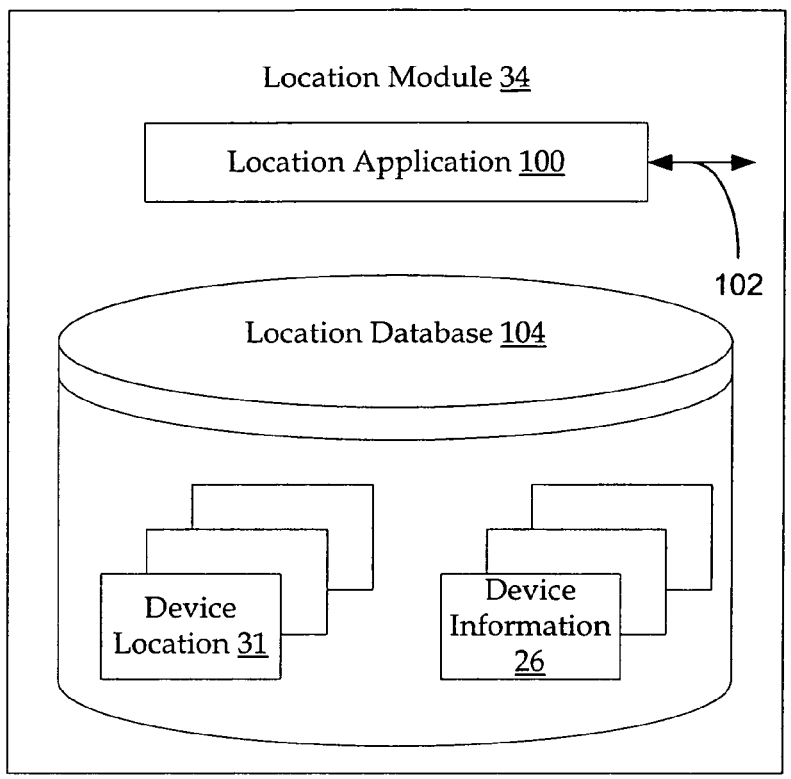
FIG. 5 is a block diagram of one embodiment of a location module associated with the group communications system of FIG. 1.

In one embodiment, for example referring to FIG. 5, location module 34 includes a location application 100 having executable instructions enabling the exchange of signals with the plurality of communications devices 18, 20, 22, 24 and the generation of the respective communication device locations 31. For example, location module 34 and/or location application 100 may include a geographic information system ("GIS"), such as a tool used to gather, transform, manipulate, analyze, and produce information related to the surface of the earth. Such a GIS can be as complex as a whole system using dedicated databases and workstations hooked up to a network, or as simple as "off-the-shelf" desktop software.

Further, in one embodiment, such a GIS may include a global positioning system ("GPS"), such as a satellite navigational system formed by satellites orbiting the earth and their corresponding receivers on the earth. The GPS satellites continuously transmit digital radio signals that contain data on the satellites' location and the exact time to the earthbound receiver. The satellites are equipped with atomic clocks that are precise, for example, to within a billionth of a second. Based on this information the receivers know how long it takes for the signal to reach the receiver on earth. As each signal travels at the speed of light, the longer it takes the receiver to get the signal, the farther away the satellite is located. By knowing how far away a satellite is, the receiver knows that it is located somewhere on the surface of an imaginary sphere centered at the satellite. By using three satellites, GPS can calculate the longitude and latitude of the receiver based on where the three spheres intersect. By using four satellites, GPS can also determine altitude. In one embodiment, the GPS "receiver" may be each of the plurality of communications devices 18, 20, 22, 24, where the respective resident location module 34 determines the respective device location 31 as described above. In this embodiment, the respective resident location module 34 forwards the respective device location 31 to location module 34 of computer system 12.

In another embodiment, such a GIS may include a network-based positioning system whereby location module 34 determines each respective device location 31 based on network communications with the plurality of communications devices 18, 20, 22, 24. For instance, communication signals 102 exchanged between location application 100 and each of the plurality of communications devices 18, 20, 22, 24 may include timing information that enables location application 100 to compute a relative position, and hence device location 31, of each respect one of the plurality of communications devices with respect to a known position. For example, such communications signals 102 may include the signals periodically exchanged between a cellular telephone and a base station. Such a network-based system may also be utilized in combination with a GPS-based system.

In one embodiment, for example, location module 34 may initiate communications at predetermined periodic intervals with each of the plurality of communications devices 18, 20, 22, 24 in order to update the respective device locations 31. Further, location module 34 may include a location database 104 for storing each of the plurality of device locations 31 in association with at least some portion of the respective device information 26 corresponding to each of the plurality of communications devices 18, 20, 22, 24. For example, in one embodiment, for each of the plurality of device locations 31, location database 104 may include a pointer or reference to the corresponding device information 26 that may be stored elsewhere in system 10. In another embodiment, for example, location database 104 may store device location 31 and device information 26 together in a table or in a relational database.

Group communications module 32, as mentioned above, is operable to establish the group call or group communications session between the call group or net identified by dispatch module 14. In one embodiment, for example, group communications module 32 may include hardware, software, firmware, etc. associated with the QChat® and/or BREWChat™ systems available from Qualcomm, Inc. of San Diego, Calif. Additionally, group communications module 32 may be operable to gather and store at least a portion of the respective device information 26 associated with the respective ones of the plurality of communications devices 18, 20, 22, 24. For example, such device information may be gathered from each of the plurality of communications devices 18, 20, 22, 24 by group communications module 32 during a registration process to enable participation in group communications. As such, group communications module 32 is further operable to exchange these portions of the respective device information 26 with dispatch module 14. Examples of group communications module 32 may include at least one of a hardware device, a software application, executable instructions, firmware, and any combination thereof embodied within and/or operable by computer system 12.

Figure 6:
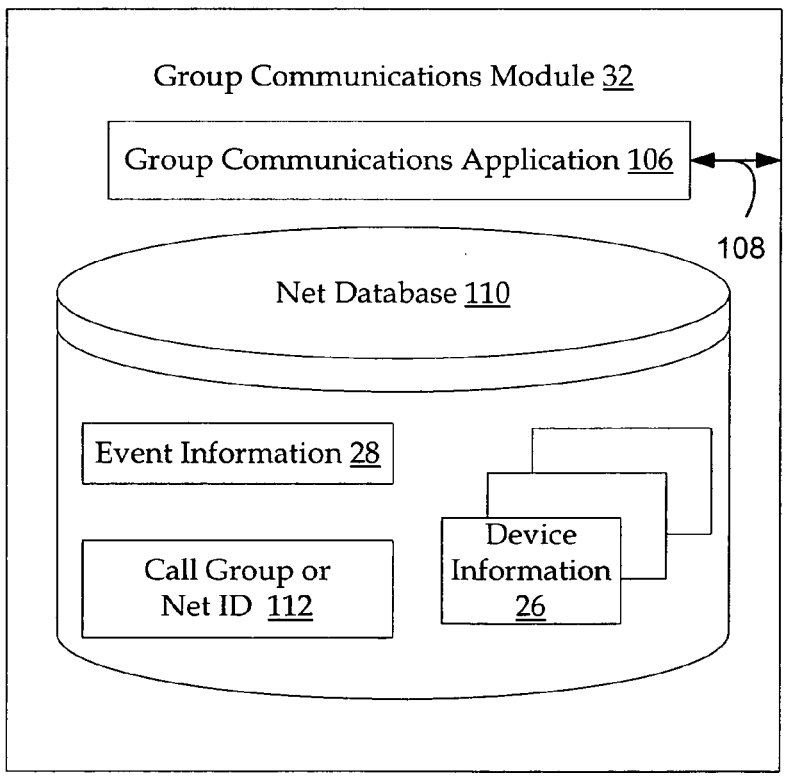
FIG. 6 is a block diagram of one embodiment of a group communications module associated with the group communications system of FIG. 1.

In one embodiment, for example referring to FIG. 6, group communications module 32 includes a group communications application 106 having executable instructions enabling the exchange of communications signals 108 with the plurality of communications devices 18, 20, 22, 24 for establishing and controlling the call group or net and the group call or group communications session. Further, group communications module 32 may additionally include a net database 110 having at least one call group or net identification 112 defining the members of a given call group or net and/or associating event information 28 with each net. Further, net database 110 may store information associating each net with its net members, e.g. the plurality of communications devices 18, 20, 22, 24. For example, in one embodiment, for each of the plurality of device information 26, net database 110 may include a pointer or reference to the corresponding call group or net identification 112 and/or the corresponding event information 28.

Referring back to FIG. 1, communications network 16 may include at least one of distributed computer network 114 and wireless communications network 116. Distributed computer network 114 may include at least one of a local area network, a wide area network, a public switched telephone network ("PSTN"), a satellite telephone network, a terrestrial telephone network, and a heterogeneous public network of computers such as the Internet. Wireless communications network 116 may include at least one or a combination of networks for providing, at least in some portion, a wireless communications transmission between two devices. Examples of wireless communications network 116 include at least one, or any combination, of: a cellular telephone network; a terrestrial telephone network; a satellite telephone network; an infrared network such as an Infrared Data Association (IrDA)-based network; a short-range wireless network; a Bluetooth® technology network; a home radio frequency (HomeRF) network; a shared wireless access protocol (SWAP) network; a wideband network, such as a wireless Ethernet compatibility alliance (WECA) network, a wireless fidelity alliance (Wi-Fi Alliance) network, and a 802.11 network; a public switched telephone network; a public heterogeneous communications network, such as the Internet; a private communications network; and land mobile radio networks. Examples of telephone networks include at least one, or any combination, of analog and digital networks/technologies, such as: Personal Communications Services, code division multiple access, wideband code division multiple access, universal mobile telecommunications system, advanced mobile phone service, time division multiple access, frequency division multiple access, global system for mobile communication, analog and digital satellite systems, and any other technologies/protocols that may be used in at least one of a wireless communications network and a data communications network.

Referring to FIG. 1, each of the plurality of communications devices 18, 20, 22, 24 may include any type of computerized device operable to transmit and receive communications signals across communications network 16. Examples of such communications devices include a cellular telephone, a satellite telephone, a land-based telephone, a personal digital assistant, a two-way pager, a desktop or laptop computer or workstation, a server, etc. As illustrated in FIG. 1, communications device 18 is in communication with computer system 12 through a wireless terrestrial telephone network 118, such as a cellular or PCS network, connected to distributed computer network 114, such as the Internet. Similarly, communications devices 20 and 22 are respectively in communication with computer system 12 through a wireless satellite telephone network 120 and a PSTN 122, both connected to distributed computer network 114. Also, communications device 24 is in communication with computer system 12 through any other type of network link 124, such as an optical cable link or a radio link, connected to distributed computer network 114.

Figure 7:
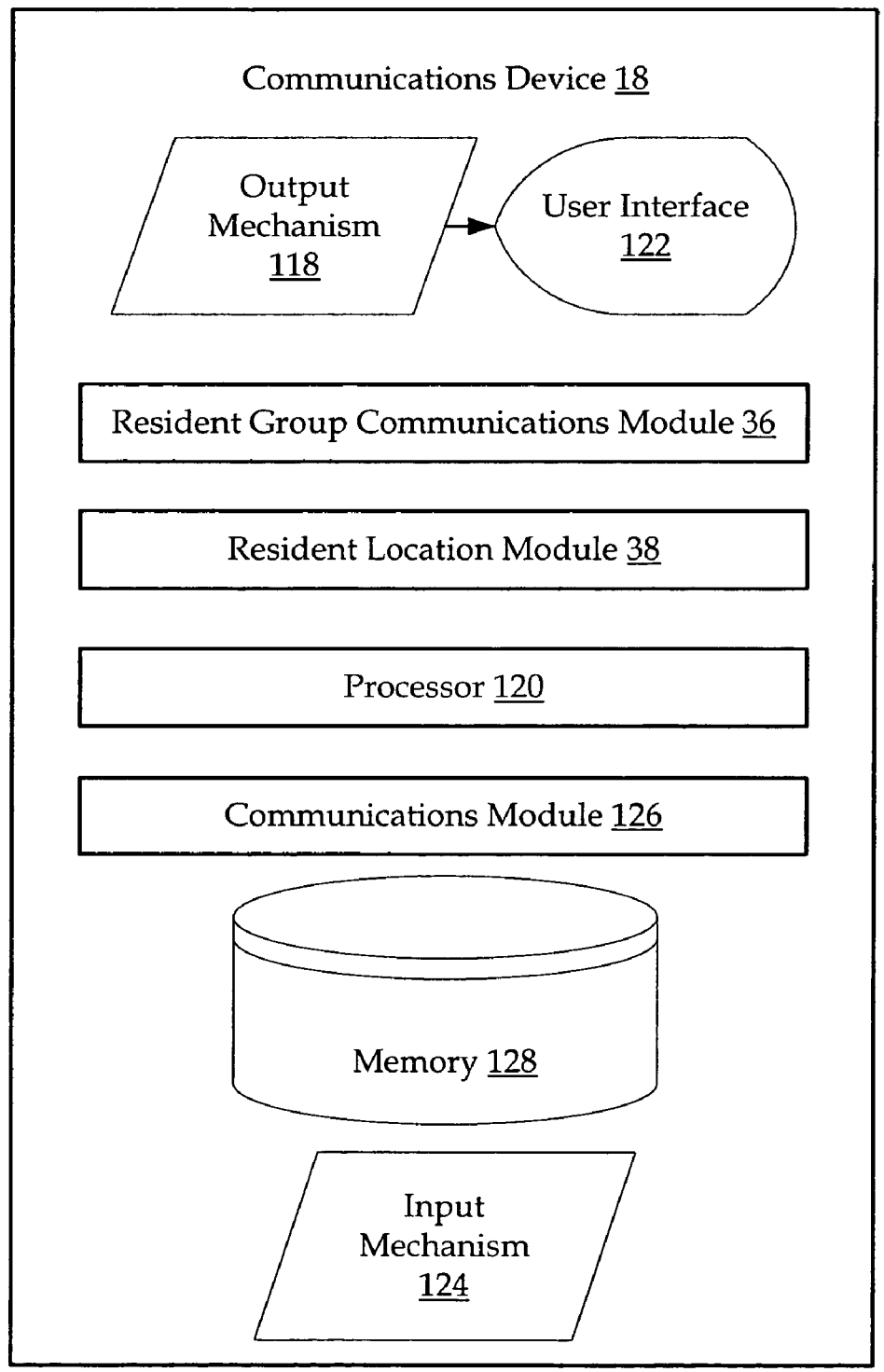
FIG. 7 is a block diagram of one embodiment of a communications device associated with the group communications system of FIG. 1.

Additionally, referring to FIG. 7 which illustrates one embodiment of communications device 18 with standard components that may be utilized by all communications devices within system 10, each communications device 18, 20, 22, 24 may also include a communications module/application 126 having at least one of hardware, software and firmware enabling the respective communications device to exchange communications signals with other communications devices across communications network 16. Communications signals may include at least one of device information 26, information relating to device location 31, voice packets and data packets including voice, graphical and text communications information. As such, each communications device 18, 20, 22, 24 may communicate to any other device associated with communications network 16. Additionally, each of the plurality of communications devices 18, 20, 22, 24 may have at least one output mechanism 118 controllable by a processor 120 to generate user interface 122 that, when prompted by resident group communications application 36, includes a representation of at least a portion of event information 28 sent from dispatch module. User interface 122 may also include other representations associated with the operation of dispatch module 14, group communications module 32 and location module 34. Examples of output mechanism 118 include a display device, such as a liquid crystal display or a light-emitting diode display, an audio device such as a speaker, and a tactile device such as a rotating mechanism to create a vibration and/or a Braille character generator. Processor 120 may include at least one of a chip and a printed circuit, which extracts instructions from memory and decodes and executes them. Examples of user interface 122 include an image or graphic, a predetermined sound, and a predetermined vibration pattern and/or a predetermined Braille character. Each communication device 18, 20, 22, 24 may further include at least one input mechanism 124 that a user may utilize to create an input into the respective communications device, such as in response to user interface 122. Examples of input mechanism 124 include a touch screen display, at least one key, an alphabetic and/or numeric keyboard, an audio input recognition device such as voice recognition software and dial tone recognition software, and any other type of device or mechanism capable of receiving an input from a user. Additionally, input mechanism 124 may include a push-to-talk ("PTT") button operable to request the floor and talk in a group communications system. Further, each communications device 18, 20, 22, 24 has a memory 128 for storing data and/or executable instructions. Memory 128 may include at least one data repository component, such as physical or virtual memory, including at least one of read-only memory (RAM), random-access memory (ROM), programmable read-only memory (PROM), electronic programmable read-only memory (EPROM), electronically-erasable programmable read-only memory (EEPROM), flash memory, magnetic media, optical media, a soft disk, a hard disk, and any other type of secondary or tertiary memory.

As mentioned above, resident group communications module 36 may be included in each of the plurality of communications devices 18, 20, 22, 24 to enable participation in a group call or group communications session. Similarly, resident location module 38 may be included in each of the plurality of communications devices 18, 20, 22, 24 to enable communication with location module 34 of computer system 12 in order to determine the respective device location 31. Examples of resident group communications module 36 and resident location module 38 may include at least one of a hardware device, a software application, executable instructions, firmware, and any combination thereof embodied within and/or operable by the respective communications device. In one embodiment, for example, each of resident group communications module 36 and resident location module 38 includes a set of executable instructions, such as a software application, stored in memory 128 of the respective communications device 18, 20, 22, 24 and operated by processor 120 to carry out functionality on the communications device associated with the respective module. Each of modules 36 and 38 may be loaded onto the respective communications device at any time, such as during the initial manufacturing of the device and/or during a communication session between the device and computer system 12 across communications network 16.

Although the plurality of communications devices 18, 20, 22, 24 have been illustrated and discussed as individual devices operating on differing types of network connections to computer system 12, other combinations are contemplated. For example, there may be multiple devices of the same type, e.g. all cellular phones, all two-way pagers, etc., as well as any other combination of any number of each type of device. In one embodiment, for example referring to FIG. 2, a plurality of devices 130 operable within system 10 include cellular telephones 18 connected to computer system 12 through, among other links, Internet 66. System 10 is not limited to any set combination of communications devices, however, in practice it may be more typical for call groups to generally be composed of like devices.

Figure 8:
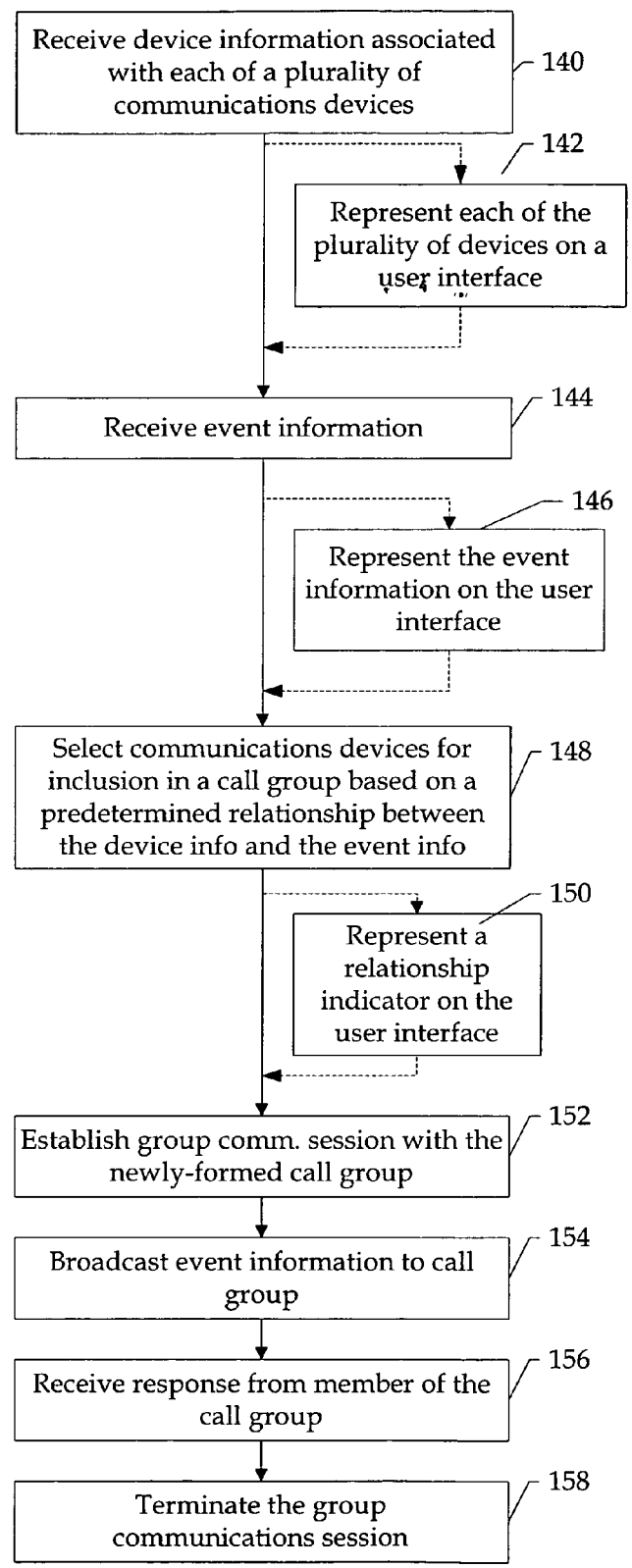
FIG. 8 is flow diagram of one embodiment of a method of establishing a group communications session, and/or a method of dispatching event information, associated with the group communications system of FIG. 1.

In operation, referring in particular to FIG. 8, one embodiment of a method of establishing a group communications session, and/or a method of dispatching event information, includes dispatch module 14 receiving communication device information from each of a plurality of communications devices operable on a communications network (Block 140). In one embodiment, communications signals providing data for device location determination may be exchanged between location module 34 and each of the plurality of communications devices 18, 20, 22, 24. For example: location module 34 requests a device location update on a predetermined periodic basis from each of the plurality of communications devices 18, 20, 22, 24. Alternately, each of the plurality of communications devices 18, 20, 22, 24 provides the device location update on a predetermined periodic basis to location module 34. In another embodiment, such device location information is exchanged between location module 34 and each of the plurality of communications devices 18, 20, 22, 24 as part of other, non-location-related communications between the communications devices and communications network 16. In any case, location module 34 forwards the determined device locations to dispatch module 14. As mentioned above, other device information may also be utilized, and such information may be supplied by communications module 32 and/or by each device 18, 20, 22, 24 to dispatch module 14.

In an optional step, some portion of the plurality of communication device information is presented on a user interface (Block 142). In one embodiment, for example, dispatch module 14 requests, and/or location module 34 automatically sends to dispatch module 14, the device location information including the plurality of device locations 31 associated with each of the plurality of communications devices 18, 20, 22, 24. Upon receiving the respective plurality of device locations 31, dispatch module 14 is operable to cause display 50 to present user interface 72 that includes the device locations, such as on a geographic map of an area/region with device indicators 88 illustrated on the map. For example, in this embodiment, such a display may be utilized by a dispatcher in a dispatch center as a quick visual reference of the distribution of communications devices, associated with users/potential responders in a given area or region. Additionally, such a display of device indicators 88 may further present or provide a reference to various other communication device information, such as a device identification, description, type or function, etc., that provides the dispatcher with additional relevant information useful in making dispatch decisions.

Further, the method includes dispatch module 14 receiving event information (Block 144). In one embodiment, for example, dispatch module 14 may receive this event information as an input from the dispatcher, who may receive the information over a public communications network, such as a "911" or emergency service associated with a public switched telephone network and Enchanced 911 ("E911") for cell phones.

In another optional step, some portion of the event information is presented on a user interface (Block 146). In one embodiment, for example, dispatch module 14 is operable to cause display 50 to present user interface 72 that includes the event location 30, such as on a geographic map of an area with event indicator 74 illustrated on the map. For example, event indicator 74 may be superimposed on the map along with the plurality of device indicators 88, thereby enabling the dispatcher to quickly get a visual reference of the number of communications devices, and associated users/responders, are in a given area/region associated with the event. Additionally, such a display of event indicator 74 may further present or provide a reference to various other event information, such as an event identification, description, type, etc., that provides the dispatcher with additional relevant information useful in making dispatch decisions.

The method further includes defining a call group, or location-based group communications net, of selected ones of the plurality of communications devices based on a predetermined relationship between the event information and the respective communication device information (Block 148). In one embodiment, for example, the selected ones of the plurality of communications devices have respective device locations within a predetermined proximity of the event location. The selected communications devices may be identified by the user/dispatcher through operation of dispatch module 14, which may include a plurality of predetermined proximities 101, such as a list of varying sized areas, regions, ranges and/or encompassing borders, from which the user/dispatcher may select to identify the set of communications devices to include in the call group. In an alternate or accompanying embodiment, dispatch module 14 may utilize a user-defined proximity to identify the set of communications devices. In a further alternate and/or accompanying embodiment, the identified call group is based on some other factor associated with each of plurality of communications devices, such as a description, type, role, function, status or priority or availability associated with the device and/or the device user.

In another optional step, the method may include presenting the predetermined relationship on a user interface (Block 150). As with the embodiment pertaining to the other optional steps noted above, dispatch module 14 is operable to cause display 50 to present user interface 72 that includes some representation of the predetermined relationship, such as a geographic map of an area with relationship indicator 99 illustrated on the map. For example, relationship indicator 99 may be superimposed on the map along with the plurality of device indicators 88 and event indicator 74, thereby enabling the dispatcher to quickly get a visual reference of the situation at hand to assess the appropriate personnel to call, to form back-up or contingency plans, to modify pre-set selection parameters, etc.

Additionally, the method includes establishing a group call, or group communications session, among the selected communication devices forming the call group (Block 152). In one embodiment, for example, dispatch module 14 sends the identified call group, or at least the individual communication device identification information used for defining a call group, to group communications module 32. Group communications module 32 thereby sets up and establishes the group call between the selected communications devices and the dispatcher. The dispatcher may communicate through computer system 12, and/or through another communications device operable on communications network 16 and included in the call group.

Further, the method includes broadcasting or transmitting at least some portion of the event information to the call group (Block 154). In one embodiment, dispatch module 14 may forward at least some portion of event information 28 to group communications module 32 for the broadcasting/transmission of this information to the members of the call group. Such event information 28 may be provided as a data and/or voice communication, such as by a dispatcher verbally relaying the event information during the group call. Alternately, or in combination, event information 28 may be sent during the group call as part of a data package received by each participating communications device and presented as part of a user interface to the associated user of the device. For example, such a data package may include maps, imagery, mug shots, rap sheets, recorded audio information such as from a "911" call, etc.

Additionally, the method may include receiving a response from at least one of the members of the call group (Block 156). In one embodiment, for example, the dispatcher and users of the selected communications devices in the call group have a discussion and/or exchange of data/information resulting in the dispatcher assigning at least one communications device, and hence associated user/responder, to the event. In another embodiment, the dispatcher may assign a group of responders to the event, where the group may include devices/device users having similar and/or different descriptions/functions/roles.

The method may additionally include terminating the group call, such as after all relevant information has been exchanged (Block 158). In one embodiment, for example, once the dispatcher has assigned a communications device/user/responder to the event, the group call may terminate, such as through a request of the dispatcher, a request of a predetermined user having termination authority, or through system settings based on a predetermined time period of inactive communications among the call group. In another embodiment, the call group may be maintained until cancelled by a predetermined participant, such as the dispatcher, after receiving feedback from the assigned responder that the event has been handled. In a further embodiment; the call group may be identified and maintained by the system for a predetermined time period so that it may be re-established by the dispatcher, or any device user having access to the system, such as in a situation where additional help and/or a different functionality/role is later required.

While the various disclosed embodiments have been illustrated and described, it will be clear that the subject matter of this document is not limited to these embodiments only. Numerous modifications, changes, variations, substitutions and equivalents will be apparent to those skilled in the art without departing from the spirit and scope of the disclosed embodiments as described in the claims.

What is claimed is:

1. A computer server of a group communications system based method of setting up a group communications session over a communications network, comprising:
   receiving event information comprising event description information and event location information, wherein said event is not related to group communications session setup;
   receiving communication device location information for each of a plurality of communication devices operable in the communications network;
   determining a call group comprising at least one member selected from the plurality of communications devices based on a relationship between the event location information and the respective communication device location information associated with each of the plurality of communications devices, wherein the relationship at least comprises ones of the plurality of communications devices having a device status corresponding to the event information, and the device status comprises an availability;
   establishing the group communications session with the at least one member of the call group, and concurrently freeing-up corresponding communication channels associated with non-selected members of the plurality of communication devices based on the relationship; and
   sending, via a data channel allocated to the group communications session, at least a portion of the event description information to the at least one member of the call group, wherein at least one communication device of the plurality is configured to display the at least a portion of the event description information.

2. The method of claim 1, wherein the relationship further comprises determining which ones of the plurality of communications devices have the communication device location information comprising device locations within a proximity to an event location included in the event location information.

3. The method of claim 2, wherein the event location comprises information selected from the group consisting of an event geographic position and an event directional component.

4. The method of claim 3, wherein each event directional component further comprises an event velocity component, and wherein establishing the call group is further based on the event velocity component.

5. The method of claim 2, wherein the respective device location of each of the plurality of communications devices comprises information selected from the group consisting of a device geographic position and a device directional component.

6. The method of claim 5, wherein each device directional component further comprises a device velocity component, and wherein establishing the call group is further based on the respective device velocity component.

7. The method of claim 2, wherein determining which ones of the plurality of communications devices have a respective device location within the proximity to the event location further comprises:
   displaying, on a user interface, a representation comprising an area associated with the event location;
   displaying a device indicator for each one of the plurality of communication devices within the area;
   receiving a selection of one of a plurality of proximities relative to the event location, wherein the selected one of the plurality of proximities comprises the proximity; and
   displaying a relationship indicator on the user interface, wherein the relationship indicator visually identifies which ones of the plurality of communication devices have a respective device location within the proximity.

8. The method of claim 7, wherein the selected one of the plurality of proximities defines the proximity as having a center that is offset from the event location.

9. The method of claim 7, wherein displaying the relationship indicator further comprises changing a characteristic of each device indicator within the proximity.

10. The method of claim 1, wherein the relationship further comprises determining which ones of the plurality of communications devices have a device type corresponding to an event type associated with the event information.

11. The method of claim 1, wherein establishing the call group further comprises including a dispatch communication device in the call group.

12. The method of claim 11, wherein establishing the group communications session further comprises establishing among at least two members of the call group.

13. The method of claim 1, further comprising forwarding the call group to a group communications module for establishing the group communications session among at least two members of the call group.

14. The method of claim 1, further comprising forwarding the event description information to the at least one member of the call group.

15. The method of claim 1, wherein receiving the event information further comprises receiving at least one of the event location information, an event identification and an event type, and further comprising receiving device information associated with each of the plurality of communications devices including at least one of the device status, a device type and the device location information, wherein determining the call group further comprises selecting ones of the plurality of communications devices based on the relationship between the at least a portion of the respective device information and a corresponding portion of the event information.

16. The method of claim 1, wherein the availability indicates at least one of whether a device user is available to respond to the event, or whether the device user is available to participate in the group communications session.

17. The method of claim 1, further comprising:
terminating the group communications session; and
maintaining the call group for a period of time after the termination of the group communications session.

18. The method of claim 17, further comprising re-establishing the group communications session after the terminating and before expiration of the time period based on the maintaining of the call group.

19. An apparatus for establishing group communications, comprising:
means for receiving notification of an event, the event comprising event description information and event location information wherein said event is not related to group communications session setup;
means for receiving communication device location information for each of a plurality of communications devices operable on a communications network;
means for determining a group comprising at least one member selected from the plurality of communications devices depending on a relationship between the event location information and the respective communication device location information associated with each of the plurality of communications devices, wherein the relationship at least comprises ones of the plurality of communications devices having a device status corresponding to the event information, and the device status comprises an availability; and
means for forwarding the event description information over the communication network to the at least one member of the group in a group communications session, and means for concurrently freeing-up corresponding communication channels associated with non-selected members of the plurality of communication devices based on the relationship, wherein at least one communication device of the group is configured to display the event description information.

20. The apparatus of claim 19, further comprising means for establishing the group communications session with the at least one member of the call group.

21. A communications apparatus, comprising:
a bus;
a processor coupled to the bus;
a memory coupled to the bus;
a communications interface coupled to the bus and operable to receive event information associated with an event comprising event description information and event location information, and communication device location information for each of a plurality of communication devices operable on a communications network;
a dispatch module storable in the memory and operable by the processor to:
obtain the event information and the communication device location information,
select at least one of the plurality of communication devices to define a call group based on a relationship between the event location information and the respective communication device location information associated with each of the plurality of communications devices, and
forward the event description information to at least one member of the call group via a group communications session, and concurrently free-up corresponding communication channels associated with non-selected members of the plurality of communication devices based on the relationship, wherein said event is not related to group communications session setup, wherein at least one communication device of the call group is configured to display at least a portion of the event description information, the relationship at least comprises ones of the plurality of communications devices having a device status corresponding to the event information, and the device status comprises an availability.

22. The apparatus of claim 21, wherein the relationship comprises ones of the plurality of communication device locations being within a proximity of the event location.

23. The apparatus of claim 21, wherein the dispatch module is further operable to:
obtain communication device information including a communication device type associated with each one of a plurality of communication devices, and
select at least one of the plurality of communication devices to define the call group based on the respective communication device type.

24. The apparatus of claim 23, wherein the event information includes an event type associated with the event, and wherein the dispatch module is further operable to select at least one of the plurality of communication devices to define the call group based on a correlation between the respective communication device type and the event type.

25. The apparatus of claim 23, wherein the communication device information associated with each of the plurality of communication devices comprises a respective communication device directional component, and wherein selecting at least one of the plurality of communication devices to define the call group is further based on the respective communication device directional component.

26. The apparatus of claim 21, further comprising an output mechanism having a user interface, wherein the dispatch module is further operable to generate a first representation comprising each of the plurality of communication devices on the user interface based on the respective communication device location.

27. The apparatus of claim 26, wherein the communication device information includes at least one of a device directional component, a device velocity, a device identification, a device type and a device status, and wherein the dispatch module is further operable to generate a second representation associated with at least one of the plurality of communications devices and comprising at least one of a device directional component, a device velocity, a device identification, a device type and a device status.

28. The apparatus of claim 27, wherein the dispatch module is further operable to generate a third representation comprising a relationship indicator associated with the event information on the user interface.

29. The apparatus of claim 21, wherein the event information further comprises an event directional component, and wherein selecting at least one of the plurality of communication devices to define the call group is further based on the event directional component.

30. The apparatus of claim 29, wherein each event directional component further comprises an event velocity component, and wherein selecting at least one of the plurality of communication devices to define the call group is further based on the event velocity component.

31. The apparatus of claim 21, further comprising a location module operable to receive a communication device identification and an associated communication device location signal for each of the plurality of communication devices, wherein the location module is operable to generate a communication device location for each of the plurality of communications devices based on the respective communication device location signal.

32. The apparatus of claim 21, wherein the communications interface is operable to:
 establish the group communications session among the selected ones of the plurality of communication devices defining the call group, and
 broadcast at least one of the event description information and the event location information associated with the event during the group communications session.

33. A communications apparatus, comprising:
 a bus;
 a processor coupled to the bus;
 a memory coupled to the bus;
 a communications interface coupled to the bus and operable to receive event information comprising an event location and an event description and operable to receive a plurality of communication device information and locations each respectively corresponding to one of a plurality of communication devices operable on a communications network;
 a dispatch module storable in the memory and operable by the processor to:
  obtain the event information and the plurality of communication device information and locations,
  select at least one of the plurality of communication devices to define a call group based on the respective communication device information and location by determining at least which ones of the plurality of communications devices have a device status corresponding to the event information, wherein the device status comprises an availability,
  generate a first representation comprising the event information on the communications interface based on the event location,
  generate a second representation comprising at least one area associated with the event location on the communications interface,
  identify respective ones of the plurality of communication devices within the at least one area, and
  output one of the event description or the event location to at least one member of the call group;
 a communications module storable in the memory and operable by the processor to:
  open a push to talk channel with the selected ones of the plurality of communication devices defining the call group,
  receive the output from the dispatch module, and
  broadcast at least one of the event description or the event location via the push to talk channel, wherein said event is not related to group communications session setup, wherein at least one of the selected ones of the plurality of communication devices is configured to display the at least one of the event description and the event location; and
 an output mechanism coupled to the bus and having the user interface, wherein the dispatch module is further operable to generate a third representation comprising each of the plurality of communication devices on the communication interface based on the respective communication device location.

34. The apparatus of claim 33, further comprising a location module in communication with each of the plurality of communication devices, the location module storable in the memory and operable by the processor to generate the corresponding plurality of communication device locations and output the plurality of communication device locations to the dispatch module.

35. A communications apparatus, comprising:
 means for dispatching information operable to:
  receive event information comprising an event location and an event description,
  receive a plurality of communication device information and locations each respectively corresponding to one of a plurality of communication devices operable on a communications network,
  select at least one of the plurality of communication devices to define a call group based on a relationship between the respective communication device information and location and the event information by determining at least which ones of the plurality of communication devices have a device status corresponding to the event information, wherein the device status comprises an availability, and
  output the call group and at least one of the event description and the event location;
 means for determining location operable to:
  receive a communication device identification and an associated communication device location signal for each of the plurality of communication devices,
  generate each communication device location based on the respective communication device location signal, and
  output the respective communication device locations to the means for dispatching information; and
 means for communications operable to:
  receive the call group and at least one of the event description or the event location and further operable to establish a group communications session among the call group, and
  broadcast at least one of displayable data generated from the event description or displayable data generated from the event location during the group communications session, wherein said event is not related to group communications session setup.

36. The apparatus of claim 35, further comprising an output means having a user interface means, wherein the means for dispatching information is further operable to generate a second representation comprising each of the plurality of communication devices on the user interface means based on the respective communication device location, and wherein the means for dispatching information is further operable to generate a third representation comprising the event information.

37. A non-transitory computer readable storage medium storing a sequence of instructions, which when executed by a processor of a communication apparatus, causes said communication apparatus to perform the actions of:
receiving event information comprising event description information and event location information, wherein said event is not related to group communications session setup;
receiving communication device location information for each of a plurality of communication devices operable in a communications network;
establishing a call group comprising at least one member selected from the plurality of communications devices based on a relationship between the event location information and the respective communication device location information associated with each of the plurality of communications devices, wherein the relationship at least comprises ones of the plurality of communications devices having a device status corresponding to the event information, and the device status comprises an availability; and
sending, over the communications network, displayable event description information to at least one member of the call group, and concurrently freeing-up corresponding communication channels associated with non-selected members of the plurality of communication devices based on the relationship, wherein the at least one communication device of the group is configured to display the event description information.

38. A communications device, comprising:
a first module operable to wirelessly transmit communication device information associated with the communications device selected from a plurality of communication devices and a communications device user, the communications device user is a potential responder to at least one event having event information, and the transmitted communication device information at least comprises a device status including an availability;
a second module operable to establish participation in a group communications session of a call group established based on a relationship between the communication device information and the event information, wherein the established participation prompts freeing-up corresponding communication channels associated with non-selected devices of the plurality of communication devices based on the relationship, and the event is not related to group communications session setup; and
a third module capable of displaying data indicative of the event information.

39. The device of claim 38, wherein the communication device information includes a device location, wherein the second module is further operable to receive the event information which comprises an event description and an event location, and wherein the call group is based on a relationship between the communication device location and the event location.

40. The device of claim 38, wherein the second module is further operable to receive the event information which further comprises an event description and an event location, and wherein the call group is based on the relationship being between the communication device status and the event information.

41. The device of claim 38, wherein the communication device information includes a device type, wherein the second module is further operable to receive the event information which further comprises an event type, and wherein the call group is based on the relationship being between the device type and the event type.

42. A wireless communications device, comprising:
means for wirelessly transmitting communication device information associated with the wireless communications device selected from a plurality of communication devices and a communications device user, wherein the communications device user is a potential responder to at least one event having event information, and the transmitted communication device information at least comprises a device status including an availability;
means for establishing participation in a group communications session of a call group established based on a relationship between the communication device information and the event information, wherein the established participation prompts freeing-up corresponding communication channels associated with non-selected devices of the plurality of communication devices based on the relationship, and the event is not related to group communications session setup; and
means for displaying event information received over a data channel during the group communications session.

43. A method of participating in a communication based on a device location, comprising:
wirelessly transmitting communication device information associated with at least one communications device selected from a plurality of communication devices and a communications device user, wherein the communications device user is a potential responder to at least one event having event information, and the transmitted communication device information at least comprises a device status including an availability;
establishing participation in a group communications session of a call group established based on a relationship between the communication device information and the event information, wherein the established participation prompts freeing-up corresponding communication channels associated with non-selected devices of the plurality of communication devices based on the relationship, and the event is not related to group communications session setup; and
displaying event information received over a data channel during the group communications session.

44. A non-transitory computer readable storage medium storing a sequence of instructions, which when executed by a processor of a communication apparatus, causes said communication apparatus to perform the actions of:
wirelessly transmitting communication device information associated with the communication apparatus selected from a plurality of communication devices and a communications device user, wherein the communications device user is a potential responder to at least one event having event information, and the transmitted communication device information at least comprises a device status including an availability;
establishing participation in a group communications session of a call group established based on a relationship between the communication device information and the event information, wherein the established participation prompts freeing-up corresponding communication channels associated with non-selected devices of the plurality of communication devices based on the relationship, and the event is not related to group communications session setup; and displaying event information received over a data channel during the group communications session.

45. At least one processor configured to perform the actions of:

receiving event information relating to an event, the event comprising event description information and event location information, wherein the event is not related to group communications session setup;

receiving a plurality of device location information each respectively corresponding to one of a plurality of communication devices operable in a communications network, wherein each received device information at least comprises a device status including an availability;

determining a call group comprising at least one member selected from the plurality of communications devices based on a relationship between the event location information and the respective communication device location information associated with each of the plurality of communications devices, wherein the relationship at least comprises ones of the plurality of communications devices having the device status corresponding to the event information; and sending the event description information over the communications network to the at least one member of the call group in a group communications session, and concurrently freeing-up corresponding communication channels associated with non-selected members of the plurality of communication devices based on the relationship, wherein the at least one communication device of the group is configured to display the event description information.

46. At least one processor configured to perform the actions of:

wirelessly transmitting communication device information associated with at least one communications device selected from a plurality of communication devices and a communications device user, wherein the communications device user is a potential responder to at least one event having event information, and the transmitted communication device information at least comprises a device status including an availability;

establishing participation in a group communications session of a call group established based on a relationship between the communication device information and the event information, wherein the established participation prompts freeing-up corresponding communication channels associated with non-selected devices of the plurality of communication devices based on the relationship, and the event is not related to group communications session setup; and displaying event information received over a data channel during the group communications session.

47. A computer server of a group communications system based method of setting up a group communications session over a communications network, comprising:

receiving event information, wherein the event is not related to group communications session setup;

receiving a plurality of device information each respectively corresponding to one of a plurality of communication devices operable in the communications network;

establishing a call group comprising at least one member selected from the plurality of communications devices based on determining a relationship between the event information and each of the plurality of device information, the relationship at least comprising ones of the plurality of communications devices having a device status corresponding to the event information, and the device status comprising an availability, wherein determining the relationship comprises determining which ones of the plurality of communications devices have the device information including device locations within a proximity to an event location included in the event information, comprising:

displaying, on a user interface, a representation comprising an area associated with the event location, displaying a device indicator for each one of the plurality of communication devices within the area, receiving a selection of one of a plurality of proximities relative to the event location, wherein the selected one of the plurality of proximities comprises the proximity, and displaying a relationship indicator on the user interface, wherein the relationship indicator visually identifies which ones of the plurality of communication devices have a respective device location within the proximity;

establishing the group communications session with the at least one member of the call group; and sending, via a data channel allocated to the group communications session, at least a portion of the event information to the at least one member of the call group, wherein at least one communication device of the plurality is configured to display the at least a portion of the event information.

48. The method of claim 47, wherein the selected one of the plurality of proximities defines the proximity as having a center that is offset from the event location.

49. The method of claim 47, wherein displaying the relationship indicator further comprises changing a characteristic of each device indicator within the proximity.

50. A communications apparatus, comprising:

a bus;

a processor coupled to the bus;

a memory coupled to the bus;

a communications interface coupled to the bus and operable to receive event information associated with an event and a plurality of communication device information each respectively corresponding to one of a plurality of communication devices operable on a communications network, wherein the communication device information includes at least one of a communication device location, a device directional component, a device velocity, a device identification, a device type and a device status;

a dispatch module storable in the memory and operable by the processor to:

obtain the event information and the plurality of communication device information, select at least one of the plurality of communication devices to define a call group based on determining a relationship between the event information and the respective communication device information, forward at least some portion of the event information to at least one member of the call group via a group communications session wherein said event is not related to group communications session setup, wherein at least one communication device of the call group is configured to display at least a portion of the event information, wherein the relationship at least comprises ones of the plurality of communications devices having a device status corresponding to the event information, wherein the device status comprises an availability, generate a first representation associated with at least one of the plurality of communications devices and comprising at least one of a device directional component, a device velocity, a device identification, a device type and a device status, and generate a second representation comprising a relationship indicator associated with the event information on the user interface; and an output mechanism having a user interface, wherein the dispatch module is further operable to generate a third representation comprising each of the plurality of communication devices on the user interface based on the respective communication device location.

* * * * *

UNITED STATES PATENT AND TRADEMARK OFFICE
CERTIFICATE OF CORRECTION

PATENT NO. : 8,396,002 B2
APPLICATION NO. : 11/364144
DATED : March 12, 2013
INVENTOR(S) : Maria I. Marshall-Wilson Page 1 of 1

It is certified that error appears in the above-identified patent and that said Letters Patent is hereby corrected as shown below:

On the Title Page, Item (54) and in the Specification, Column 1, Line 1, Title should read:

-- APPARATUS AND METHODS FOR GROUP COMMUNICATIONS --

Signed and Sealed this
Thirtieth Day of July, 2013

Teresa Stanek Rea
*Acting Director of the United States Patent and Trademark Office*